United States Patent [19]

Ozawa et al.

[11] 4,142,018

[45] Feb. 27, 1979

[54] PROCESS FOR FORMING METALLIC FINISH COATINGS

[75] Inventors: Hiroshi Ozawa; Yoshinori Torii; Nobuki Kobayashi; Koji Ishikawa, all of Yokohama, Japan

[73] Assignee: Mitsui Toatsu Chemicals, Inc., Japan

[21] Appl. No.: 762,182

[22] Filed: Jan. 24, 1977

[30] Foreign Application Priority Data

Jan. 30, 1976 [JA] Japan ............................. 51-8334

[51] Int. Cl.[2] ........................... B32B 7/08; B05D 3/02

[52] U.S. Cl. .................................... 428/323; 427/195; 427/202; 427/375; 427/407 R; 427/409; 428/328; 428/461; 428/514; 428/520

[58] Field of Search ................... 427/27, 33, 185, 195, 427/202, 375, 388 A, 388 C, 409; 428/461, 500, 515, 323, 328, 520, 514

[56] References Cited

U.S. PATENT DOCUMENTS

| | | | |
|---|---|---|---|
| Re. 29,028 | 11/1976 | Katsimbas | 427/185 X |
| 3,888,943 | 6/1975 | Labana et al. | 427/27 X |
| 3,919,345 | 11/1975 | Labana et al. | 427/27 |
| 3,932,367 | 1/1976 | Labana et al. | 427/27 X |
| 3,939,127 | 2/1976 | Labana et al. | 427/27 X |
| 3,943,082 | 3/1976 | Smith et al. | 427/27 X |
| 3,953,643 | 4/1976 | Cheung et al. | 427/409 X |
| 3,953,644 | 4/1976 | Camelon et al. | 427/202 X |
| 3,976,715 | 8/1976 | Labana et al. | 427/27 X |
| 3,976,718 | 8/1976 | Labana et al. | 427/27 X |
| 4,009,131 | 2/1977 | Farone | 427/27 X |

*Primary Examiner*—Shrive P. Beck
*Attorney, Agent, or Firm*—Wenderoth, Lind & Ponack

[57] ABSTRACT

A process for forming a coating with a metallic finish, which comprises (1) a first step of coating an article with [A] a water-thinnable paint comprising (a) a cross-linkable (meth)acrylate ester copolymer or a mixture of the (meth)acrylate ester copolymers containing at least 0.1 equivalent, per 1,000 g of resin solids, of a carboxyl or carboxyl ion group and a group capable of undergoing a ring-opening reaction with the carboxyl or carboxy ion group upon heating, both of said groups being contained in the same or different copolymers, and having a number average molecular weight of at least 3,000 and (b) metallic scales, and baking the coating paint to form a coating containing the metallic scales and (2) a second step of coating [B] a powder paint comprising a (meth)acrylate ester copolymer having a glycidyl or $\beta$-methylglycidyl group and a polycarboxylic acid on the scale-containing coating obtained in the first step, and baking the coated paint to form a protective coating for the scale-containing coating.

10 Claims, No Drawings

PROCESS FOR FORMING METALLIC FINISH COATINGS

This invention relates to a process for forming a coating having a metallic finish which is frequently used for painting metallic articles such as automotive bodies. More specifically, the invention relates to a process for forming a metallic finish coating, which is easy to repair and has superior durability and color vividness without substantially causing air pollution during the coating operation.

In recent years, much importance has been attached in the paint industry to the control of air pollution caused by organic solvents such as hydrocarbons which are contained in paints, and investigations have been undertaken to develop water-borne paints or powder paints as non-polluting paints. It is technically difficult in various respects, however, to form a metallic finish coating using a water-borne or powder paint. For example, attempts to obtain satisfactory metallic finish coatings from water-borne paints tend to result in coating defects such as the occurrence of pinholes or sagging upon evaporation of water, and this disadvantage is especially outstanding when humidity is high in the environment in which coating is performed. To overcome this disadvantage would require extra treatments such as humidity adjustment of the coating environment, a number of coating operations, and repeated baking, which will cause a drastic reduction in productivity. On the other hand, when powder paints are used to form metallic finish coatings, metallic scales become oriented at random, and the appearance of the metallic-finish coating obtained differs from that of a coating obtained from a solvent-based paint. For this reason, such a coating cannot be repaired with conventional repairing paints (solvent-based air drying paints). Moreover, the powder paint cannot be used for repair because it requires a baking temperature of at least 100° C.

It is an object of this invention to remove all the aforesaid defects which arise when the non-polluting paints are utilized for forming metallic finish coatings.

Another object of this invention is to provide a process for forming a metallic finish coating which can be easily repaired with conventional solvent-based air drying paints.

Still another object of this invention is to provide a process for forming a metallic finish coating having superior durability, especially weatherability and moisture resistance, and good vividness, in which the amount of an organic solvent evolved in a coating step is reduced and no air pollution is caused.

The present invention provides a process for forming a metallic finish coating which can achieve the above objects and which comprises (1) a first step of coating an article with [A] a water-thinnable paint comprising (a) a cross-linkable (meth)acrylate ester copolymer or a mixture of the meth(acrylate) copolymers containing at least 0.1 equivalent, per 1,000 g of resin solids, of a carboxyl or carboxyl ion group and a group capable of undergoing a ring-opening reaction with the carboxyl or carboxyl ion group upon heating, both of said groups being contained in the same or different copolymers, and having a number average molecular weight of at least 3,000 and (b) metallic scales, and baking the coated paint to form a coating containing the metallic scales, and (2) a second step of coating [B] an acrylic powder paint comprising a (meth)acrylate ester copolymer having a glycidyl or β-methylglycidyl group and a polycarboxylic acid on the metallic scale-containing coating obtained in the first step, and baking the coated paint to form a protective coating and for the metallic scale-containing coating.

The resin component of the water-thinnable paint [A] used in this invention, that is, the aforesaid (meth)acrylic acid ester copolymer, includes, for example, copolymers derived from (1) at least one (meth)acrylate ester monomer such as methyl methacrylate, ethyl methacrylate, propyl methacrylate, n-butyl methacrylate, isobutyl methacrylate, 2-ethylhexyl methacrylate, lauryl methacrylate, tridecyl methacrylate, stearyl methacrylate, oleyl methacrylate, cyclohexyl methacrylate, tetrahydrofurfuryl methacrylate, hydroxyethyl methacrylate, hydroxypropyl methacrylate, hydroxybutyl methacrylate, polypropylene oxide methacrylate, methyl acylate, ethyl acrylate, propyl acrylate, n-butyl acrylate, isobutyl acrylate, 2-ethylhexyl acrylate, stearyl acrylate, oleyl acrylate, cyclohexyl acrylate, hydroxyethyl acrylate, hydroxypropyl acrylate, hydroxybutyl acrylate, polyethylene oxide acrylate, or polypropylene oxide acrylate, (2) at least one unsaturated carboxylic acid or its anhydride such as acrylic acid, methacrylic acid, maleic anhydride, fumaric acid, itaconic acid or crotonic acid, and (3) at least one monomer containing a group capable of undergoing a ring-opening reaction with the carboxyl group of such an unsaturated carboxylic acid or its anhydride upon heating, such as glycidyl-containing monomer (e.g., glycidyl methacrylate, β-methyl glycidyl methacrylate, glycidyl acrylate or β-methyl glycidyl acrylate), or an oxazolinyl-containing monomer (e.g., vinyl oxazoline); and copolymers derived from aforesaid monomers (1) to (3) and (4) at least one vinyl monomer copolymerizable therewith, such as styrene, vinyltoluene, α-methylstyrene, acrylonitrile, methacrylonitrile, acrylamide, methacrylamide, methylol acrylamide, alkoxy methylol acrylamide, vinyl oxazoline, vinyl acetate, vinyl propionate, or a vinyl ester of versatic acid.

The group capable of undergoing a ring-opening reaction with the carboxyl or carboxyl ion group of the (meth)acrylic acid ester copolymer upon heating may be contained in the same copolymer, or in different copolymers. Accordingly, examples of the (meth)acrylic acid ester copolymer as a resin component of the water-thinnable paint [A] in the present invention are:

(i) a copolymer containing both a carboxyl group (and/or a carboxyl ion group) and a glycidyl group (and/or an oxazolinyl group);

(ii) a mixture of a copolymer containing both a carboxyl group (and/or a carboxyl ion group) and a glycidyl group (and/or an oxazolinyl group) and a copolymer containing a carboxyl group (and/or a carboxyl ion group); (iii) a mixture of a copolymer containing both a carboxyl group (and/or a carboxyl ion group) and a glycidyl group (and/or an oxazolinyl group) and a copolymer containing a glycidyl group (and/or an oxazolinyl group); and (iv) a mixture of a copolymer containing a carboxyl group (and/or a carboxyl ion group) and a copolymer containing a glycidyl group (and/or an oxazolinyl group).

The (meth)acrylic acid ester copolymer can be easily prepared by various known methods such as solution polymerization, bulk polymerization or emulsion polymerization. The water-thinnable paint [A] can be obtained by adding water to the (meth)acrylate ester copolymer resin after, if desired, adding ammonia or an amine such as trimethylamine, triethylamine, triethanolamine, dimethyl ethanolamine, diethyl ethanolamine, triisopropanolamine, dimethyl benzylamine, dimethyl isopropanolamine or morpholine; and then admixing the resulting mixture with metallic scales. In order for the (meth)acrylate ester copolymer resin to be water-thinnable, it must be in the form of either an aqueous solution of its salt in water, an emulsion of its fine particles with a size of, say, 0.01 to 0.5 micron dispersed in water, or a system in which the aqueous solution and the emulsion exist together. In particular, the copolymer resin containing a glycidyl group and/or an oxazolinyl group is preferably in the form of an emulsion irrespective of whether it contains a carboxyl group and/or a carboxyl ion group.

The (meth)acrylate ester copolymer resin, a main ingredient of the water-thinnable paint [A], contains at least 0.1 equivalent, per 1,000 g of the resin solids, of a carboxyl or carboxyl ion group. The carboxyl or carboxyl ion group undergoes a ring-opening reaction with the glycidyl or oxazolinyl group mentioned above at the time of baking to form a tough heat-cured coating, and contribute to a marked improvement of the adhesion between the heat-cured coating and a coating formed by the acrylic powder paint [B], and the durability (weatherability and moisture resistance) of the resulting metallic finish coating. If the content of the carboxyl groups or carboxyl ion group in the (meth)acrylate ester copolymer is below 0.1 equivalent per 1,000 g of the resin solids, the cross-linking of the copolymer at the time of baking is insufficient, and the adhesion between the scale-containing coating and a coating formed by the acrylic powder paint [B] and the durability of the resulting metallic finish coating are reduced.

Especially preferably, the content of the carboxyl or carboxyl ion group in the (meth)acrylate ester copolymer resin is 0.2 to 1.2 equivalents per 1,000 g of the resin solids.

The content of the group capable of undergoing a ring-opening reaction with the carboxyl or carboxyl ion group at the time of heating, for example, a glycidyl group given as a result of copolymerizing a glycidyl monomer such as glycidyl methacrylate, β-methyl glycidyl methacrylate, glycidyl acrylate or β-methyl glycidyl acrylate, and/or an oxazolinyl group given as a result of copolymerizing an oxazolinyl-containing monomer such as vinyl oxazoline, is preferably 0.5 to 2.0 equivalents based on the carboxyl or carboxyl ion group.

Since the reaction between the glycidyl group or oxazolinyl group and the carboxyl or carboxyl ion group at the time of baking is a ring-opening reaction, no volatile component evolves. For this reason, there is scarcely any occurrence of coating defects such as pinholes even when the coated article is again baked after coating the acrylic powder paint [B]. If, for example, a hydroxyl group reacts with an alkoxy methylol melamine resin or a methylol acrylamide group at the time of crosslinking the resin component of an aqueous paint, volatile components such as water or alcohols evolve also at the time of baking the coated article after coating the acrylic powder paint. Thus, when a coating to be formed by the acrylic powder paint has a large thickness, defects such as pinholes arise. From this viewpoint, the inclusion of a carboxyl or carboxyl ion group and a glycidyl or oxazolinyl group in the copolymer resin component in the water-thinnable paint plays a very important role in imparting vividness and superior appearance which are of utmost value in the painting of automobile bodies, for example. It is generally considered that the remaining of excessive amounts of carboxyl groups is not desirable because it causes a reduction in water resistance. According to the present invention, however, the carboxyl groups react with the glycidyl or oxazolinyl groups in the baking step, whereby the content of carboxyl groups in the resulting coating decreases and the durability of the coating can be enhanced.

It is necessary that the (meth)acrylate ester copolymer used in this invention should have a number average molecular weight of at least 3,000, preferably at least 8,000. If the number average molecular weight of the copolymer resin is below 3,000, it is difficult to distribute the metallic scales uniformly in the coating and baking of the water-thinnable paint, and the desired metallic tone cannot be provided. From practical viewpoints, therefore, metallic finish coatings which can be repaired with repairing paints such as solvent-based air drying paints cannot be formed.

In order to use the (meth)acrylate ester copolymers specified in the present invention for coating, at least one kind of them is in the form of an emulsion of fine particles in an aqueous medium or in the form of a so-called hydrosol.

Desirably, the proportion of the (meth)acrylate ester copolymer is at least 60% by weight, preferably at least 90% by weight, based on the total resin solids content of the water-thinnable paint [A]. If it is less than 60% by weight, a uniform mixing of the metallic scales cannot be obtained, and it is difficult to form a metallic finish coating which is easy to repair.

Typical examples of the metallic scales included in the water-thinnable paint [A] are aluminum scales, bronze scales, copper scales, and stainless steel scales. Of these, the aluminum scales are most versatile. It is preferred to incorporate the metallic scales usually in an amount of 5 to 20% by weight based on the resin solids of the water-thinnable paint [A].

Generally, a coloring pigment is added to the water-thinnable paint [A] in order to obtain the desired color hue. Furthermore, the water-thinnable paint [A] may contain water-soluble polyester resins, alkoxy methylol melamine resins, thickeners, defoamers, levelling agents, plasticizers, anticrater agents, or water-miscible organic solvents in amounts which do not impair the effects of the present invention.

Coating of the metallic scale-containing layer is performed preferably such that its thickness after baking becomes 15 to 30 microns.

Articles to be coated are, for example, metallic materials such as iron or aluminum whose surface has been treated chemically or physically by known methods; metallic materials having a primer coated and baked by known methods such as electrodeposition; and inorganic materials such as porcelains, glass or ceramics.

The water-thinnable paint [A] containing metallic scales is baked in a dryer usually held at a temperature of 150° to 180° C. to afford a metallic scale-containing coating with the metallic scales oriented uniformly.

The resulting scale-containing coating still has insufficient durability (weatherability and moisture resistance), and lacks vividness. Accordingly, a coating for protecting the coated layer is formed by applying the acrylic powder paint [B] on the metal scale-containing coating and baking it. As a result, a metallic finish coating having improved durability and vividness and a very satisfactory utilitarian value can be formed.

The acrylic powder paint [B] consists of a (meth)acrylate ester copolymer containing a glycidyl or β-methyl glycidyl group and a polycarboxylic acid. The copolymer as a main ingredient of the acrylic powder paint [B] includes, for example, resins obtained by copolymerizing (1) at least one monomer containing a glycidyl or β-methyl glycidyl group such as glycidyl acrylate, glycidyl methacrylate, β-methyl glycidyl acrylate or β-methyl glycidyl methacrylate, and (2) at least one (meth)acrylate ester monomer such as methyl methacrylate, ethyl methacrylate, ethyl methacrylate, propyl methacrylate, n-butyl methacrylate, isobutyl methacrylate, 2-ethylhexyl methacrylate, lauryl methacrylate, stearyl methacrylate, cyclohexyl methacrylate, hydroxyethyl methacrylate, hydroxypropyl methacrylate, hydroxybutyl methacrylate, methyl acrylate, ethyl acrylate, propyl acrylate, n-butyl acrylate, isobutyl acrylate, 2-ethylhexyl acrylate, cyclohexyl acrylate, hydroxyethyl acrylate, or hydroxypropyl acrylate; and copolymers obtained by copolymerizing (1) at least one of the monomers containing a glycidyl group or a β-methyl glycidyl group mentioned above, (2) at least one of the (meth)acrylate esters mentioned above, and (3) at least one vinyl-polymerizable monomer copolymerizable with the monomers (1) and (2), such as styrene, α-methylstyrene, vinyltoluene, acrylonitrile, methacrylonitrile, acrylamide, methacrylamide, vinyl acetate, vinyl propionate, versatic acid vinyl esters, methylol acrylamide and alkoxy methylol amides.

Preferably, the content of the glycidyl or β-methyl glycidyl group in the above copolymer is within the range of 0.5 to 2.5 equivalents per 1,000 g of the copolymer resin. Furthermore, it is preferred that the (meth)acrylate ester copolymer containing a glycidyl or β-methyl glycidyl group have a glass transition point of at least 20° C., and a number average molecular weight of 2,000 to 10,000.

Examples of the polycarboxylic acid compound used as a crosslinking agent for the acrylic powder paint [B] are succinic acid, adipic acid, pimelic acid, sebacic acid, azelaic acid, 1,12-dodecanedioic acid, 1,13-tridecanedioic acid, 1,14-tetradecanedioic acid, 1,16-hexadecanedioic acid, 1,18-octadecanedioic acid, 1,20-eicosanedioic acid, 1,24-tetracosanedioic acid, eicosadienedioic acid, phthalic acid, isophthalic acid, tetrahydrophthalic acid, hexahydrophthalic acid, 3,9-bis (2-carboxyethyl)-2,4,8,10-tetraoxa[5,5]undecane, polyester resins containing at least 2 carboxyl groups per molecule, polyamide resins, and acrylic resins.

The content of the polycarboxylic acid in the acrylic powdery paint [B] is one sufficient to provide 0.5 to 1.5 equivalents of a carboxyl group per glycidyl or β-methyl glycidyl group of the (meth)acrylate ester copolymer resin containing a glycidyl or β-methyl glycidyl group.

The acrylic powdery paint [B] may contain suitable amounts of known additives such as aids in smoothing cated surfaces, flowability adjusting aids, or plasticizers. Or coloring pigments may be added in amounts which do not hide the metallic layer. Usually, these additives may be mixed by a melt-mixing method or a wet-mixing method. Generally, it is preferred to coat the acrylic powder paint [B] to a thickness of at least 20 microns. The baking temperature for the acrylic powder paint [B] is preferably about 150° to 200° C. in order to obtain superior durability of the coating and satisfactory metallic vividness.

According to the present invention, the protective coated film adheres firmly to the metallic scale-containing coated film, and has very good durability (weatherability and moisture resistance) and superior vividness and can be easily repaired with repairing paints such as solvent-based air drying paints. Furthermore, the amount of organic solvents used in this invention can be drastically reduced as compared with the use of conventional solvent-based paints, and the pollution of the working environment by the volatilization of organic solvents can be avoided. Accordingly, the process of this invention has a very great utilitarian value.

The following Examples specifically illustrate the present invention.

(1) Preparation of a water-thinnable paint [A] and formation of a metallic scale-containing coating:

(1-1) A monomeric mixture consisting of 30% by weight of methyl methacrylate, 30% by weight of ethyl acrylate, 15% by weight of glycidyl methacrylate, 5% by weight of acrylic acid, and 20% by weight of styrene was emulsion-polymerized to afford an emulsion (a resin solids content of 40% by weight) of a copolymer containing 0.69 equivalent of carboxyl groups and 1.06 equivalents of glycidyl groups per 1,000 g of the resin solids, and having a number average molecular weight of 8,500 and an average particle diameter of 0.12 micron (40% by weight of resin solids). The pH of the emulsion was adjusted to 7.5 with dimethyl ethanolamine. 250 Parts by weight of this emulsion was mixed with 20 parts by weight of a 50% by weight butyl Cellosolve slurry of scale-like aluminum powder (Alpaste 1109 MA, a trademark for a product of Toyo Aluminum Co., Ltd.) with stirring, and the mixture was diluted with water to afford a water-thinnable paint [A].

The resulting water-thinnable paint was spray-coated on a primed metal plate for test purposes, and baked at 170° C. for 20 minutes to form a metallic scale-containing coating having a thickness of 20 microns.

The primed plate had been prepared by first diluting "POWER COAT" (a maleinized polybutadiene-type paint for use as a primer in electrodeposition, a trademark for a product of Nippon Paint Co., Ltd.) with deionized water, adjusting its pH to 8.0 with dimethyl ethanolamine, placing the diluted paint in an electrodeposition bath, and performing electrodeposition at 200 volts for 2 minutes using a 0.8 thick steel sheet treated with iron phosphate as a cathode, washing the sheet with water, and then baking it at 170° C. for 20 minutes.

(1-2) A monomeric mixture consisting of 50% by weight of methyl methacrylate, 30% by weight of butyl acrylate, 10% by weight of vinyltoluene, 3% by weight of hydroxypropyl methacrylate and 7% by weight of methacrylic acid was solution-polymerized in isopropyl alcohol in a concentration of 80% by weight to afford a copolymer resin having a number average molecular weight of 4,500 containing 0.81 equivalent of carboxyl groups per 1,000 g of resin solids. Diethanolamine was added to the copolymer to adjust its pH to 8.0, and the resin was diluted to a concentration of 40% by weight with water.

Separately, a monomeric mixture consisting of 35% by weight of methyl methacrylate, 20% by weight of isobutyl acrylate, 7.5% by weight of β-methyl glycidyl methacrylate, 7.5% by weight of glycidyl acrylate, 5% by weight of hydroxyethyl methacrylate and 25% by weight of styrene to afford an emulsion (a resin solids content of 40% by weight) of a copolymer resin having a number average molecular weight of 18,000 and containing 1.05 equivalents, per 1,000 g of the resin solids of glycidyl groups.

50 Parts by weight of the aqueous solution of the copolymer and 200 parts by weight of the emulsion of the copolymer obtained were mixed with 20 part by weight of a 50% by weight butyl Cellosolve slurry of Alpaste 1109MA with stirring, and the mixture was diluted with water to form a water-thinnable paint [A].

The resulting wate--thinnable paint was spray-coated on the same primed metal plate as used in (1-1) above in the same way as set forth in (1-1) above to form a metallic scale-containing coating.

(1-3) A monomeric mixture consisting of 50% by weight of methyl methacrylate, 45% by weight of n-butyl acrylate and 5% by weight of methacrylic acid was polymerized to form a copolymer resin having a number average molecular weight of 12,000 and an average particle diameter of 0.02 micron and containing 0.94 equivalent per 1,000 g of resin solids of carboxyl groups. The copolymer was dispersed in a concentration of 40% by weight in a mixture of water and ethyl Cellosolve (with a water/ethyl Cellosolve weight ratio of 7:3) to form an acrylic hydrosol aqueous dispersion.

Separately, a monomeric mixture consisting of 50% by weight of ethyl metharcrylate, 35% by weight of n-butyl acrylate, 2% by weight of acrylic acid and 13% by weight of vinyl oxazoline was emulsion-polymerized to afford an emulsion (a resin solids content of 40% by weight) of a copolymer having a number average molecular weight of 25,000 and an average particle diameter of 0.21 micron and containing 0.28 equivalent of carboxyl groups and 1.34 equivalents of oxazolinyl groups per 1,000 g of the resin solids.

50 Parts by weight of the acrylic hydrosol aqueous dispersion and 200 parts by weight of the emulsion of the copolymer thus obtained were mixed with 20 parts by weight of a 50% by weight butyl Cellosolve slurry of Alpaste 1109MA with stirring, and the mixture was diluted with water to prepare a water-thinnable paint [A].

The resulting paint was spray-coated on the same primed metal plate as used in (1-1) above in the same way as in (1-1) above, and baked to form a metallic scale-containing coating.

(1-4) A monomeric mixture consisting of 42% by weight of methyl methacrylate 25% by weight of ethyl acrylate, 5% by weight of hydroxypropyl methacrylate, 20% by weight of cyclohexyl methacrylate and 8% by weight of methacrylic acid was emulsion-polymerized to afford an emulsion (a resin solids content of 40% by weight) of a copolymer having a number average molecular weight of 6,400 and an average particle diameter of 0.14 micron and containing 0.93 equivalent of carboxyl groups per 1,000 g of the resin solids.

Separately, a monomeric mixture consisting of 32% by weight of methyl methacrylate, 25% by weight of ethyl acrylate, 5% by weight of hydroxypropyl methacrylate, 20% by weight of cyclohexyl methacrylate, 10% by weight of glycidyl methacrylate and 8% by weight of vinyl oxazoline was emulsion-polymerized to afford an emulsion (a resin solids content of 40% by weight) of a copolymer resin having a number average molecular weight of 5,100 and an average particle diameter of 0.20 micron and containing 0.70 equivalent of glycidyl groups and 0.82 equivalent of oxazolinyl groups per 1,000 g of the resin solids.

125 Parts by weight of the emulsion of the copolymer and 125 parts by weight of the emulsion of the copolymer prepared as above were mixed, and the mixture treated with dimethyl ethanolamine to adjust its pH to 8.0. Then, 20 parts by weight of a 50% by weight butyl Cellosolve slurry of Alpaste 1109MA was mixed with the resulting mixture while stirring, and the mixture was diluted with water to prepare a water-thinnable paint [A].

The resulting paint was spray-coated on the same primed metal plate as used in (1-1) above, and baked in the same way as in (1-1) above to form a metallic scale-containing coating.

(2) Preparation of an acrylic powder, paint [B] and formation of a transparent coating:

(2-1) A monomeric mixture consisting of 45% by weight of methyl methacrylate, 25% by weight of styrene, 5% by weight of hydroxyethyl acrylate, 20% by weight of glycidyl methacrylate and 5% by weight of n-butyl acrylate to prepare a solid copolymer resin. 90 Parts by weight of the resulting solid resin was melt-mixed with 10 parts by weight of sebasic acid and 1 part by weight of Resimix L (a trademark for a product of Mohawk Ind., Ltd.) as a coated surface-smoothing aid using an extruder. The mixture was cooled and pulverized. Particles which passed through a 200-mesh screen were collected to form an acrylic powder paint [B].

The solid copolymer resin obtained had a number average molecular weight of 4,200 and a glass transition point, as measured by a dilatometer, of 54° C. and containing 1.4 equivalents per 1,000 g of the resin, of glycidyl groups.

The resulting acrylic powder paint [B] so prepared was coated on each of the metallic scale-containing coatings obtained in (1-1), (1-2) and (1-3) above to a thickness of 30 to 35 microns by means of an electrostatic powder coating machine, and baked at 170° C. for 20 minutes to afford test plates (I), (II) and (III) each having a metallic finish coating.

(2-2) A monomeric mixture consisting of 47% by weight of isobutyl methacrylate, 10% by weight of vinyl toluene, 10% by weight of cyclohexyl acrylate, 15% by weight of ethyl acrylate and 18% by weight of $\beta$-methyl glycidyl methacrylate to form a solid copolymer resin.

85 Parts by weight of the copolymer resin, 12 parts by weight of 1,20-eicosanedioic acid, 2 parts by weight of cyclohexanedicarboxylic acid and 1 part by weight of Resimix L were melt-mixed by an extruder, cooled, and pulverized. Particles which passed through a 200-mesh screen were collected to form an acrylic powder paint [B].

The above copolymer resin contained 1.15 equivalents, per 1,000 g of the copolymer resin, of $\beta$-methyl glycidyl groups, and had a glass transition point, as measured by a dilatometer, of 36° C. and a number average molecular weight of 3,600.

The acrylic powder paint so prepared was coated on each of the metallic scale-containing coatings formed in (1-2), (1-3) and (1-4), and baked in the same way as set forth in (2-1) above to afford test plates (IV), (V) and (VI) having a metallic finish coating.

(3) Formation of coatings for comparison purposes:

(3-1) A monomeric mixture consisting of 40% by weight of methyl methacrylate, 30% by weight of butyl acrylate, 10% by weight of vinyl toluene, 13% by weight of hydroxypropyl methacrylate and 7% by weight of methacrylic acid in isopropyl alcohol in a concentration of 80% by weight was solution-polymerized to afford an aqueous solution of a copolymer resin containing 0.81 equivalent, per 1,000 g of the resin solids, of carboxyl groups and having a number average molecular weight of 4,500. Dimethyl ethanolamine was added to the aqueous solution to adjust its pH to 8.0. It was diluted with water to a concentration of 40% by weight.

Separately, the same monomeric mixture as set forth above was emulsion-polymerized to afford an emulsion (a resin solids content of 40% by weight) of a copolymer resin having a number average molecular weight of 15,000.

50 Parts by weight of the aqueous solution of the copolymer and 150 parts by weight of the emulsion of the copolymer thus prepared were mixed with 20 parts by weight of a methylated methylol resin (Cymel 303, a product of American Cyanamid Company) and 20 parts by weight of a 50% by weight butyl Cellosolve slurry of Alpaste 1109MA with stirring. The resulting mixture was spray-coated on the same primed metal plate as used in (1-1) above, and baked in the same way as in (1-1) above to form a metallic scale-containing coating.

The acrylic powder paint set forth in (2-1) above was coated on the metallic scale-containing coating, and baked in the same way as in (2-1) to produce a test plate (VII).

(3-2) A water-thinnable paint obtained by removing the scale-like aluminum powder from the water-thinnable paint used in (1-1) above was coated to a dry coating thickness of 30 to 35 microns on the test plate which was obtained in (1-1) above by coating the water-thinnable paint [A] and baking it. The coating was baked at 170° C. for 20 minutes to form a transparent coating. A test plate (VIII) having a metallic finish coating was thus produced.

(3-3) 100 Parts by weight of the acrylic powder paint [B] set forth in (2-1) above was mixed with 5 parts by weight of dry aluminum powder obtained by washing scale-like aluminum powder (Alpaste 1109MA) with acetone, drying it in vacuo, and passing it through a 200-mesh screen. In the same way as set forth in (2-1) above, the mixture was coated on the primed metal plate set forth in (1-1) above, and baked to form a metallic coating having a thickness, after baking, of 45 to 50 microns. Thus, a test plate (IX) having a metallic finish coating was obtained.

(3-4) An organic solvent-soluble paint composed mainly of an alkyd resin and a butylated melamine formaldehyde resin (having an alkyl resin/butylated melamine formaldehyde resin ratio, in terms of the weight of solids, of 70/30) was coated on the same test metal plate as set forth in (1-1) above, and baked at 140° C. for 20 minutes to form a coating having a thickness of 40 microns.

Then, an organic solvent-soluble acrylic paint composed mainly of a hydroxyl-containing thermosetting acrylic resin and a butylated melamine formaldehyde resin (the ratio of the thermosetting acrylic resin/butylated melamine formaldehyde ratio, in terms of the weight of solids, of 70/30) and containing 5% by weight, based on the resin solids, of scale-like aluminum powder (Alpaste 1109MA) was coated on the resulting baked coating, and then baked at 170° C. for 20 minutes to form a top coating having a thickness of 30 to 35 microns. Thus, a test plate (X) having a metallic finish coating was obtained.

(4) Evaluation of test plates

The test plates (I) to (VI) in accordance with the present invention and the test plates (VII) to (X) for comparison were evaluated for the items tabulated below.

Vividness (by visual observation)

| Test plate No. | Evaluation |
|---|---|
| (I) | Very good |
| (II) | Very good |
| (III) | Very good |
| (IV) | Very good |
| (V) | Very good |
| (VI) | Very good |
| (VII) | Poor |
| (VIII) | Poor |
| (IX) | Poor |
| (X) | Generally good |

Appearance of coating (by visual observation)

| Test Plate No. | Evaluation |
|---|---|
| (I) | Very good |
| (II) | Very good |
| (III) | Very good |
| (IV) | Very good |
| (V) | Very good |
| (VI) | Very good |
| (VII) | Pinholes occurred partly |
| (VIII) | Pinholes occurred markedly |
| (IX) | Projection of aluminum particles observed |
| (X) | Generally good |

Repairability (by visual observation*)

| Test plate No. | Evaluation |
|---|---|
| (I) | Good |
| (II) | Good |
| (III) | Good |
| (IV) | Good |
| (V) | Good |
| (VI) | Good |
| (VII) | Good |
| (VIII) | Generally good |
| (IX) | Extremely poor |
| (X) | Good |

*Note
A half of the area of each test plate was coated with a solvent-based metallic finish repairing paint [an air drying paint obtained by mixing a thermoplastic acrylic resin with a scaly aluminum powder (Alpaste 1109MA)], and dried at 80° C for 30 minutes. The repairability of the test plate was evaluated by seeing whether there was a difference in the oriented state of aluminum particles between the coated area and the uncoated area. "Good" in the above evaluation means that the area coated with the repairing paint, when visually observed, does not present a metallic finish appearance different from that of the uncoated area; in other words, they are similar to each other in appearance to an extent satisfactory for practical purposes.

Adhesion between layers(by crosscut tape peeling after immersing in warm water*)

| Test plate No. | Evaluation |
|---|---|
| (I) | No change |
| (II) | No change |
| (III) | No change |
| (IV) | No change |
| (V) | No change |
| (VI) | No change |
| (VII) | Partial peeling occurred |
| (VIII) | No change |
| (IX) | No change |
| (X) | Partial peeling occurred |

*Note
Each of the test plates was immersed in warm water at 40° C for 500 hours and then crosscuts at intervals of 1 mm were provided on the coated film both lengthwise and crosswise using a microknife. A pressure-sensitive Cellophane tape was adhered to the cuts, and peeled. The state of the coating was observed to determine whether or not it was peeled off.

Rust resistance (by visual observation of the delamination of the coated film and the occurrence of rust*

| Test plate No. | Evaluation |
|---|---|
| (I) | No change |
| (II) | No change |
| (III) | No change |
| (IV) | No change |
| (V) | No change |
| (VI) | No change |
| (VII) | Rust occurred partly |
| (VIII) | Rust occurred markedly |
| (IX) | Rust occurred partly |

-continued

| | |
|---|---|
| (X) | Rust occurred partly |

*Note
10 Kg of silica sand was let fall onto each of the test plates from a height of 2 meters, and then the peeling of the coating was examined. Then, each of the test plates was placed in a salt spray tester for 540 hours, and then the occurrence of rust was examined.

| | Weatherability(*) | |
|---|---|---|
| Test plate No. | Gloss retention (%) | Crosscut tape peeling |
| (I) | 90 | No change |
| (II) | 88 | No change |
| (III) | 87 | No change |
| (IV) | 89 | No change |
| (V) | 86 | No change |
| (VI) | 88 | No change |
| (VII) | 85 | No change |
| (VIII) | 73 | Partial peeling occurred |
| (IX) | 79 | Partial peeling occurred |
| (X) | 74 | Partial peeling occurred |

(*)Note
Each of the test plates was placed in a sunshine weather-ometer, and exposed for 1,000 hours. After the exposure, the gloss retention of each test plate was measured. Furthermore, crosscuts were provided at intervals of 1 mm on the coated film both lengthwise and crosswise, and a pressure-sensitive Cellophane tape was adhered to the cuts. The tape as then removed, and the state of the coating was observed to determine whether or not it was peeled off.

What is claimed is:

1. A process for forming a coating with a metallic finish, which comprises:

(1) a first step of coating an article with [A] a water-thinnable paint consisting essentially of (a) a cross-linkable resin which is a (meth)acrylate ester copolymer or a mixture of (meth)acrylate ester copolymers containing (i) at least 0.1 equivalent, per 1,000 g of resin solids, of a carboxyl or carboxyl ion group and (ii) a group capable of undergoing a ring-opening reaction with the carboxyl or carboxyl ion group upon heating, which group is glycidyl, β-methylglycidyl or oxazolinyl, both of groups (i) and (ii) being contained in the same or different copolymers, and said copolymer or copolymers having a number average molecular weight of at least 3,000, said water-thinnable paint being in the form of either an aqueous solution of salt of the resin in water, an emulsion of fine particles of the resin solids dispersed in water, or a system in which the aqueous solution and the emulsion exist together and (b) metallic scales, and baking the coated paint to form a coating containing the metallic scales, and then (2) a second step of coating [B] a powder paint comprising a (meth)acrylate ester copolymer having a glycidyl or β-methylglycidyl group and a polycarboxylic acid on the scale-containing coating obtained in the first step, and baking the coated paint to form a protective coating for the scale-containing coating.

2. The process of claim 1 wherein the content of the glycidyl, β-methylglycidyl or oxazolinyl group in the copolymer resin is 0.5 to 2.0 equivalents per equivalent of the carboxyl or carboxyl ion group.

3. The process of claim 1 wherein the water-thinnable paint [A] contains the (meth)acrylate ester copolymer resin in an amount of at least 60% by weight based on its total resin solids content.

4. The process of claim 1 wherein the content of the metallic scales in the water-thinnable paint [A] is 5 to 20% by weight based on its total resin solids content.

5. The process of claim 1 wherein the powdery paint [B] consists of a (meth)acrylate ester copolymer resin containing 0.5 to 2.5 equivalents, per 1,000 g of the copolymer resin, of a glycidyl or β-methyl glycidyl group and the polycarboxylic acid in an amount sufficient to give 0.5 to 1.5 equivalents of carboxyl groups per equivalent of the glycidyl or β-methyl glycidyl group.

6. The process of claim 1 wherein the resin component of the water-thinnable paint [A] is a (meth)acrylate ester copolymer containing both a carboxyl or carboxyl ion group and a glycidyl, β-methylglycidyl or oxazolinyl group.

7. The process of claim 1 wherein the resin component of the water-thinnable paint [A] is a mixture of a (meth)acrylate ester copolymer containing both a carboxyl or carboxyl ion group and a glycidyl, β-methylglycidyl or oxazolinyl group with a (meth)acrylate ester copolymer containing a carboxyl or carboxyl ion group.

8. The process of claim 1 wherein the resin component of the water-thinnable paint [A] is a mixture of a (meth)acrylate ester copolymer containing both a carboxyl or carboxyl ion group and a glycidyl, β-methylglycidyl or oxazolinyl group with a (meth)acrylate ester copolymer containing a glycidyl or oxazolinyl group.

9. The process of claim 1 wherein the resin component of the water-thinnable paint [A] is a (meth)acrylate copolymer containing a carboxyl or carboxyl ion group with a (meth)acrylate ester copolymer containing a glycidyl, β-methylglycidyl or oxazolinyl group.

10. An article, having a metallic-finish, produced by the process of claim 1.

* * * * *